US005240302A

United States Patent [19]

Yoshida et al.

[11] Patent Number: 5,240,302
[45] Date of Patent: Aug. 31, 1993

[54] SEAT SUPPORTING DEVICE FOR A FOLDABLE SEAT

[75] Inventors: Hiroyuki Yoshida, Kanagawa; Masakazu Yoshimura, Tokyo, both of Japan

[73] Assignees: Nissan Motor Co., Ltd., Yokohama; Tachi-S Co., Ltd., Akishima, both of Japan

[21] Appl. No.: 953,982

[22] Filed: Sep. 30, 1992

[30] Foreign Application Priority Data

Sep. 30, 1991 [JP] Japan ................................ 3-250903

[51] Int. Cl.[5] ............................................ B60N 2/14
[52] U.S. Cl. ....................................... 296/65.1; 297/15
[58] Field of Search .................. 296/65.1; 297/15, 326

[56] References Cited

U.S. PATENT DOCUMENTS

| | | | |
|---|---|---|---|
| 1,231,156 | 6/1917 | Heaslet | 297/15 |
| 1,649,608 | 11/1927 | Matthews | 296/65.1 |
| 2,565,666 | 8/1951 | Schaefer | 296/65.1 X |
| 4,512,609 | 4/1985 | Pärsson | 296/89.1 X |
| 4,637,653 | 1/1987 | Yoshida et al. | 296/65.1 X |
| 4,869,541 | 9/1989 | Wainwright | 296/65.1 |

FOREIGN PATENT DOCUMENTS 2-96219 7/1990 Japan .

*Primary Examiner*—David M. Mitchell
*Assistant Examiner*—Gary C. Hoge
*Attorney, Agent, or Firm*—Foley & Lardner

[57] ABSTRACT

A seat supporting device for a foldable seat, includes a stationary hinge bracket secured to a vehicle floor and a rotary hinge bracket which is rotatably mounted on the stationary hinge bracket and on which a seat cushion is rotatably mounted. A latch mechanism shiftable between first and second positions is provided. With the latch mechanism in the first position, the rotary hinge bracket is locked to the stationary hinge bracket. With the latch mechanism in the second position, the seat cushion is locked to the rotary hinge bracket in substantially upright state and the rotary hinge bracket with the seat cushion locked thereto is rotatable relative to the stationary hinge bracket to be displaced to a stored position substantially parallel to the vehicle floor.

1 Claim, 7 Drawing Sheets

SEAT SUPPORTING DEVICE FOR A FOLDABLE SEAT

BACKGROUND OF THE INVENTION

The present invention relates to a seat supporting device for a foldable seat adapted for a rear seat of a vehicle of the van type.

Japanese Utility Model Application First Publication No. 2-96219 discloses a seat supporting device for a foldable rear seat. The seat supporting device includes a stationary bracket secured to a vehicle floor, a rotary bracket which is rotatably connected with the stationary bracket and secured to a seat cushion of the rear seat, and a locking means for locking the rotary bracket to the stationary bracket.

When the rotary bracket is forwardly rotated together with the seat cushion on the stationary bracket into the foremost inclined position, the rotary bracket is locked to the stationary bracket and the seat cushion with a seat back folded thereon is held in substantially upstanding state on the vehicle floor. The upstanding seat cushion disturbs a rearward view of a driver of the vehicle and limits an available space on the vehicle floor.

An object of the present invention is to provide a seat supporting device for a foldable seat which is capable of supporting the seat in a substantially flat position relative to the vehicle floor so as to increase an available space on the vehicle floor.

SUMMARY OF THE INVENTION

According to the present invention, there is provided a seat supporting device for a foldable seat, comprising:

a stationary hinge bracket secured to a vehicle floor;

a rotary hinge bracket rotatably mounted on the stationary hinge bracket for rotation about a first axis on the stationary hinge bracket;

a seat cushion rotatably mounted on the rotary hinge bracket for rotation about a second axis on the rotary hinge bracket and having a first position wherein the seat cushion is occupiable, and a second position wherein the seat cushion is angularly displaced about the second axis; and latch means shiftable between a first position wherein the rotary hinge bracket is locked to the stationary hinge bracket and a second position wherein the rotary hinge bracket is rotatable relative to the stationary hinge bracket about the first axis and the seat cushion is locked to the rotary hinge bracket after the seat cushion has been displaced to the second position;

whereby with the latch means in the second position thereof, the seat cushion and the rotary hinge bracket are angularly displaced about the first axis to a stored position.

DESCRIPTION OF THE PREFERRED EMBODIMENT

Figure 1:
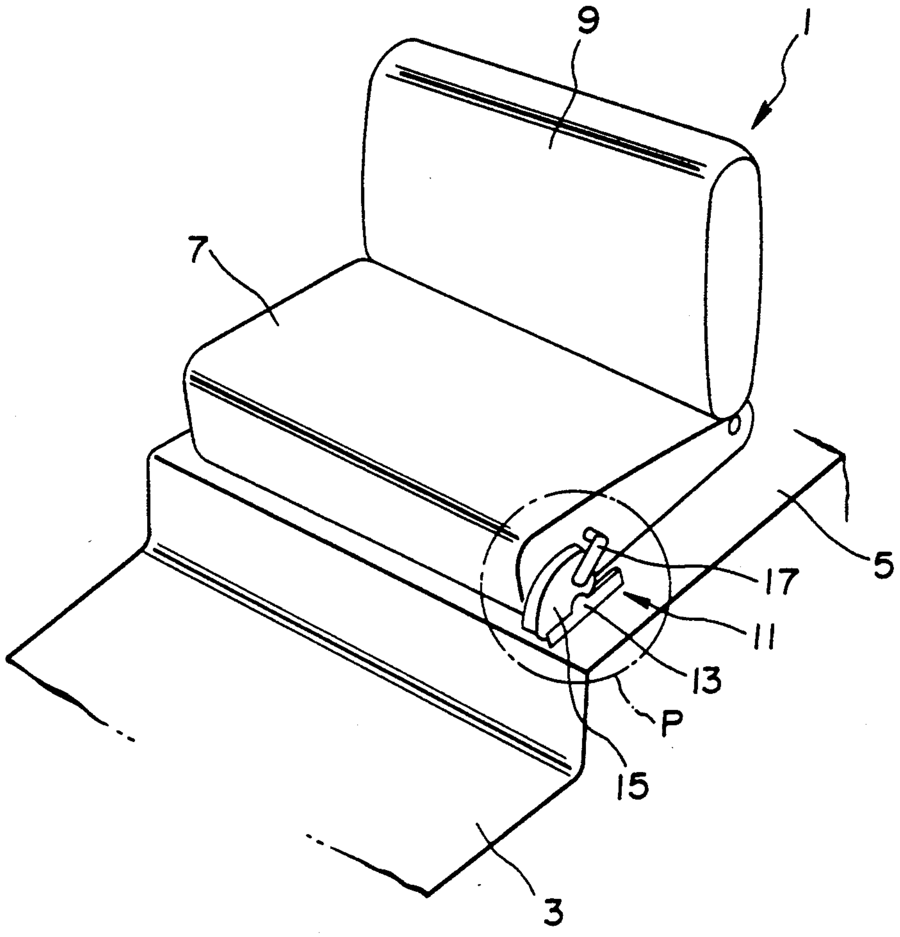
FIG. 1 is a perspective view of a rear seat, showing a preferred embodiment of a seat supporting device according to the present invention.

Referring now to FIG. 1, there is shown a schematic perspective view of a foldable rear seat 1 of a generally known one box car. The rear seat 1 is mounted on a rear section 5 of a vehicle floor which is formed as being higher than a front section 3. The rear seat 1 comprises a seat cushion 7 and a seat back 9 which is foldable on the seat cushion 7. The seat cushion 7 is supported on the rear section 5 of the vehicle floor by a seat supporting device 11 according to the present invention, as shown in a circle P of FIG. 1. The seat supporting device 11 is mounted on a left side of the seat cushion 7 as viewed in FIG. 1, but may be arranged on a right side thereof.

Figure 2:
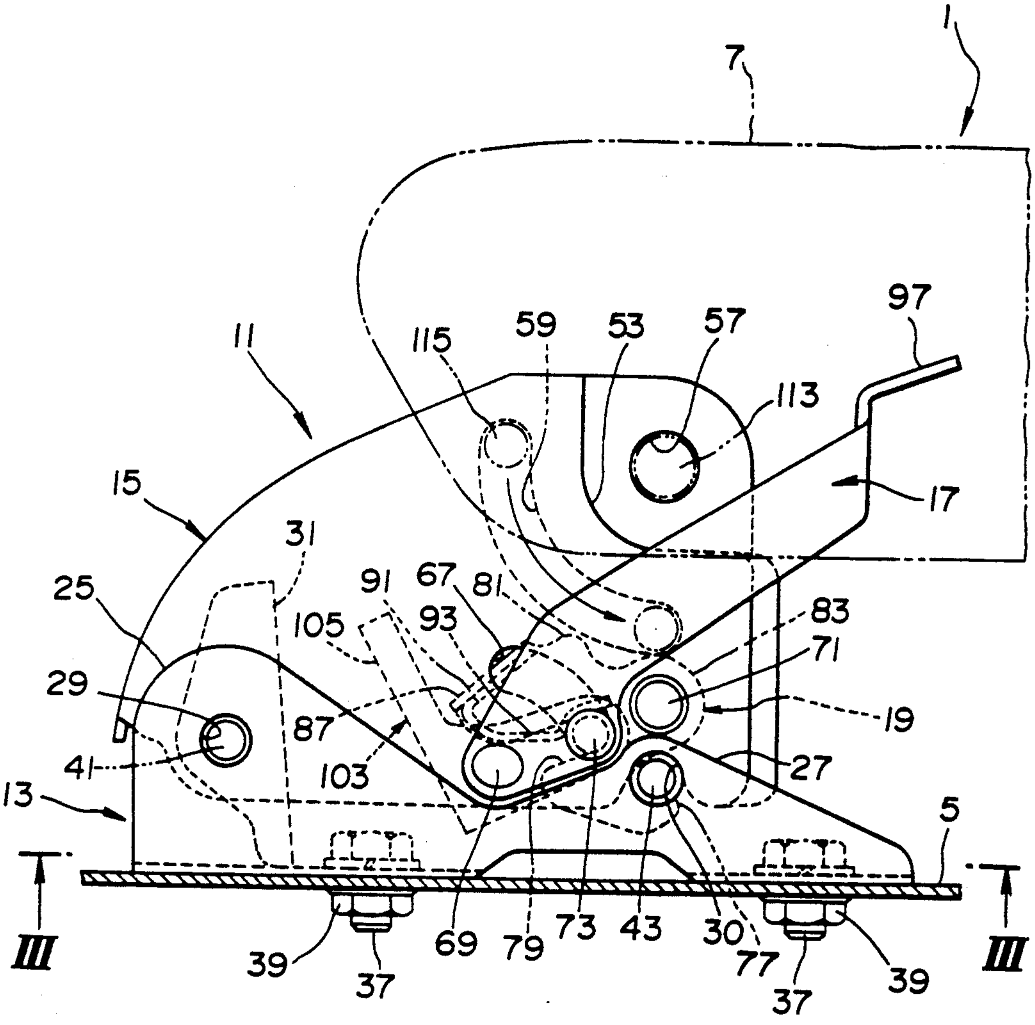
FIG. 2 is a sectional view of the seat supporting device of FIG. 1, in which a seat cushion is in its original occupiable position.
Figure 4:
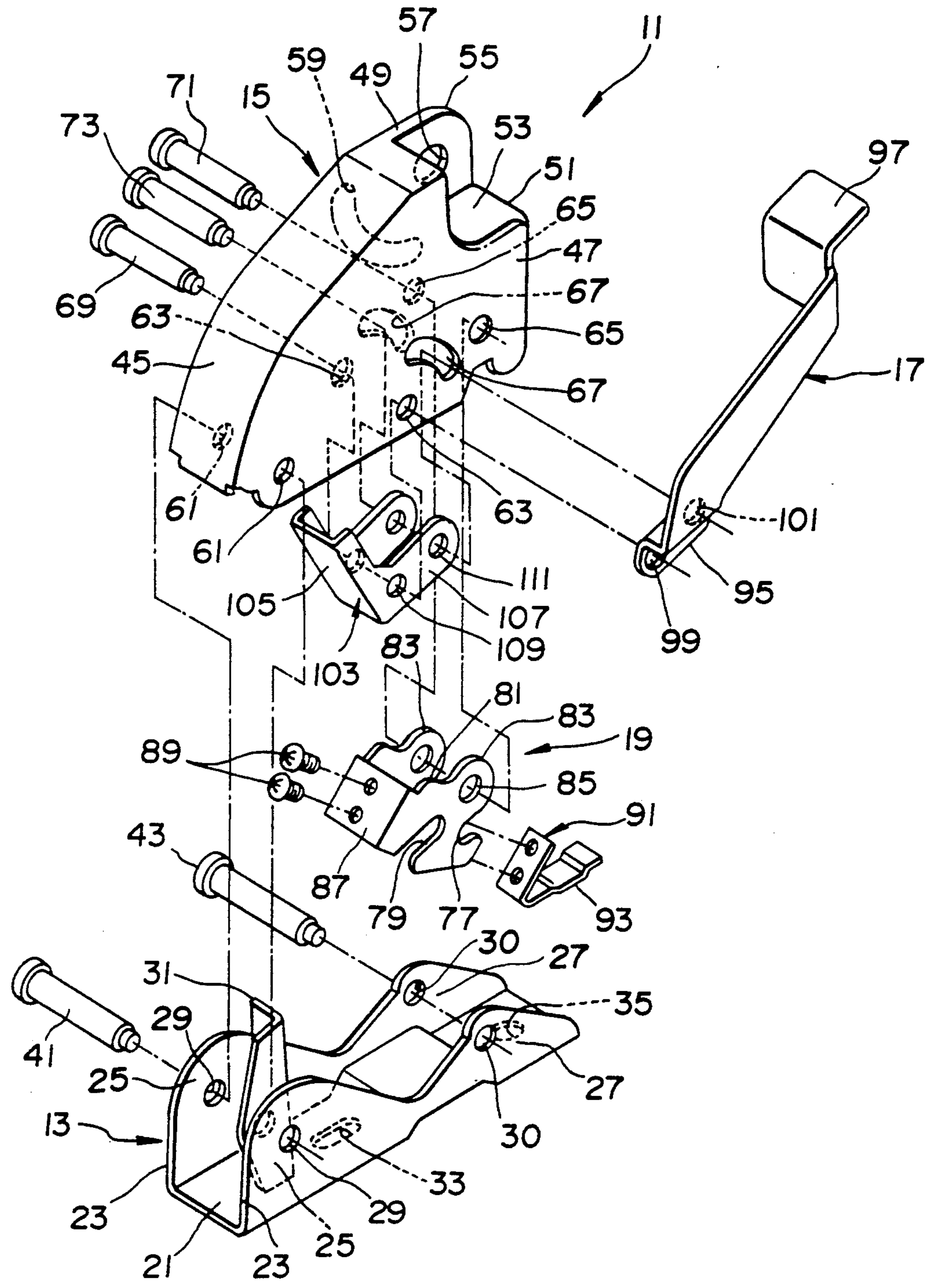
FIG. 4 is an exploded view of the seat supporting device.

As best seen in FIG. 2, the seat supporting device 11 comprises a stationary hinge bracket 13 secured to the rear section 5 of the vehicle floor by means of bolts 37 and nuts 39. The stationary hinge bracket 13 has a U-shaped lateral cross section and includes a bottom wall 21 and left and right side walls 23 as seen in FIG. 4. Referring to FIG. 4, the bottom wall 21 has front and rear portions formed respectively with holes 33 and 35 through which the bolts 37 are inserted. The side walls 23 have hinge pin support portions 25 formed with hinge pin holes 29 and lock pin support portions 27 formed with lock pin holes 30, respectively. A lock pin 43 is inserted and fitted into the lock pin holes 30 of the lock pin support portions 27 of the opposed left and right side walls 23.

Figure 3:
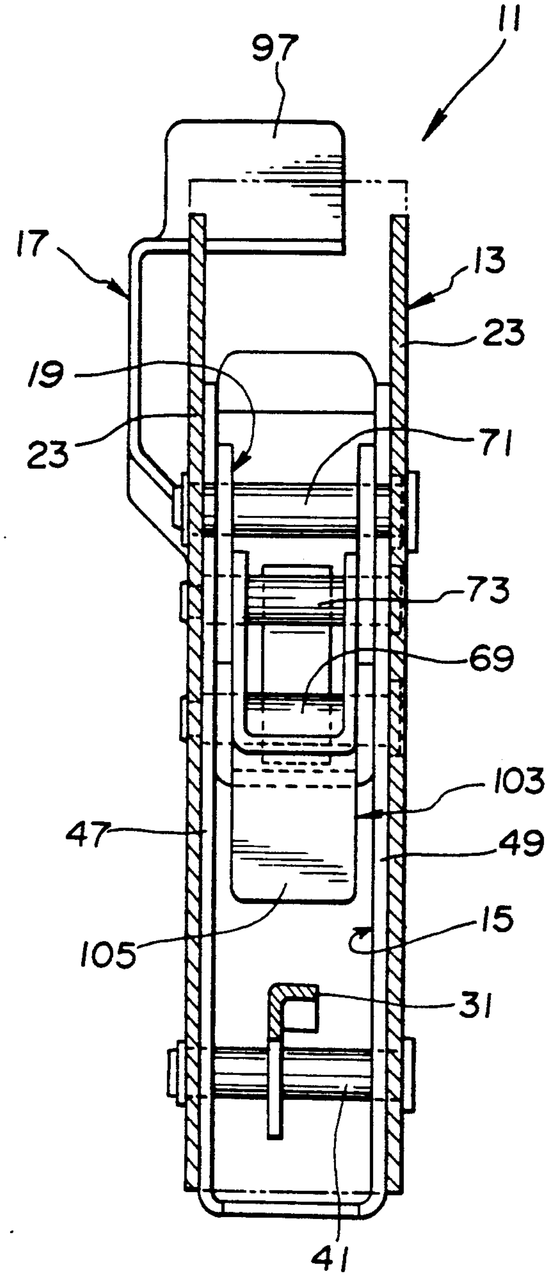
FIG. 3 is a sectional view taken along line III—III of FIG. 2.

Disposed between the left and right side walls 23 of the stationary hinge bracket 13 is a rotary hinge bracket 15. As shown in FIGS. 3 and 4, the rotary hinge bracket 15 has a forwardly and downwardly sloped top wall 45, left and right side walls 47 and 49, and a rear wall 51. The side walls 47 and 49 of the rotary hinge bracket 15 are formed with hinge pin holes 61 and latch support pin holes 65 at front and rear portions thereof, respectively. A hinge pin 41 is inserted through the hinge pin holes 29 of the stationary hinge bracket 13 and the hinge pin holes 61 of the rotary hinge bracket 15, serving as a first axis for rotation of the rotary hinge bracket 15. As a result, the rotary hinge bracket 15 is rotatably mounted on the stationary hinge bracket 13 so as to be pivoted about the hinge pin 41. The hinge pin 41 is also inserted through a stopper 31 disposed between the side walls 47 and 49 of the rotary hinge bracket 15. The stopper 31 is fixedly secured to the hinge pin 41 and thus held stationary relative to the stationary hinge bracket 13.

Inserted into the latch support pin holes 65 of the rotary hinge bracket 15 is a latch support pin 71. The latch support pin 71 is inserted also through holes 85 formed on left and right side walls 83 of a latch 19. The latch 19 has a U-shaped cross section as shown in FIG.

3 and is rotatably supported on the latch support pin 71 between the side walls 47 and 49 of the rotary hinge bracket 15 as best seen in FIG. 4.

As shown in FIG. 4, the side walls 83 of the latch 19 are formed with notches 79 and interconnected by an end wall 87. A V-shaped leaf spring 91 is secured to the end wall 87 by means of screws 89. The leaf spring 91 is formed with a curved portion 93 which projects into a space laterally extending along the notches 79 of the latch 19 when secured to the end wall 87. The side walls 83 are formed with notches 77 which are arranged to catch the lock pin 43 mounted on the stationary hinge bracket 13.

Disposed between the side walls 83 of the latch 19 is an L-shaped lever support 103 as shown in FIG. 3. As seen in FIG. 4, the lever support 103 has an end wall 105 and left and right side walls 107 each of which is formed with holes 109 and 111. A lever support pin 69 is inserted through lever support pin holes 63 formed at middle portions of the side walls 47 and 49 of the rotary hinge bracket 15 and the holes 109 of the lever support 103, and then securely fitted into a hole 99 which is formed at one end portion 95 of a lever 17. The lever 17 is integrally rotatable with the lever support 103 and rotatably mounted on the left side wall 47 of the rotary hinge bracket 15 by means of the lever support pin 69. A lever guide pin 73 is inserted into the hole 111 of the lever support 103 as well as arcuate lever guide holes 67 which are formed between the lever support pin holes 63 and the latch support pin holes 65 of the rotary hinge bracket 15. The lever guide pin 73 has one end securely fitted into a hole 101 which is formed on the lever 17. Reffering to FIG. 2, the lever guide pin 73 is guided and movable along the arcuate lever guide holes 67 of the rotary hinge bracket 15. The lever guide pin 73 is also slidably engaged with the notches 79 on the latch 19 and the curved portion 93 of the leaf spring 91. By actuating a tab 97 formed at the other end of the lever 17, the lever guide pin 73 slides along the arcuate lever guide holes 67 and the notches 79. In addition, to the notches 79, the side walls 83 of the latch 19 are formed with notches 77 as shown in FIG. 4. The notches 77 are adapted to catch the lock pin 43 secured on the stationary hinge bracket 13 as seen in FIG. 2.

Figure 5:
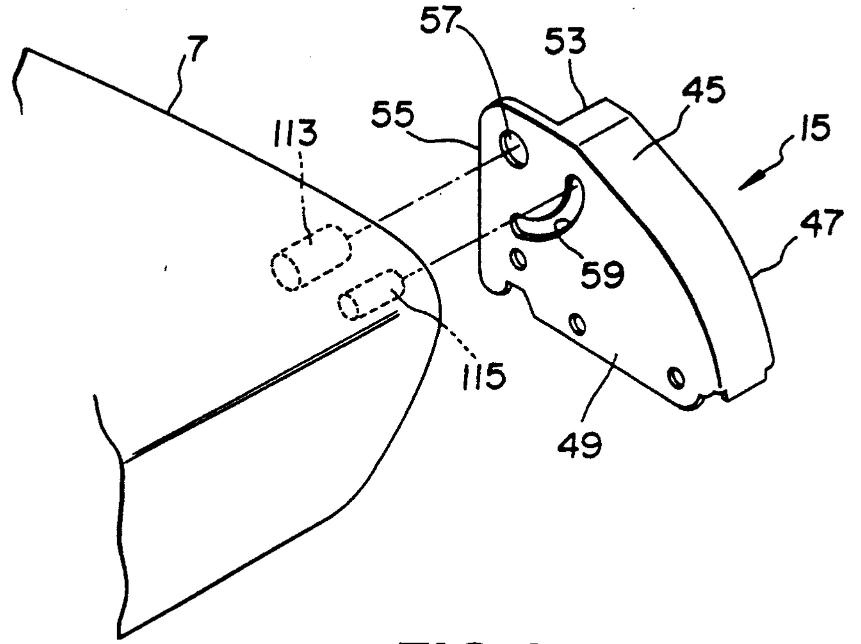
FIG. 5 is a perspective fragmentary view of the seat cushion and a rotary hinge bracket of the seat supporting device secured thereto.

As shown in FIG. 4, the right side wall 49 of the rotary hinge bracket 15 extends upwardly from a shoulder portion 53 of the rear wall 51 to provide a seat mounting section 55. The seat mounting section 55 is formed with a hinge pin hole 57 which is engaged with a seat hinge pin 113 secured to a left side wall of the seat cushion 7 as best seen in FIG. 5. The seat hinge pin 113 serves as a second axis for rotation of the seat cushion 7 on the rotary hinge bracket 15. On the right side wall 49 is formed an arcuate guide hole 59 into which a guide pin 115 secured to the left side wall of the seat cushion 7 is fitted. In a lowermost portion of the guide hole 59 as viewed in FIG. 6, the guide pin 115 is engaged with shoulders 81 which are formed on the side walls 83 of the latch 19. Alternatively, the guide pin 115 may be secured to the rotary hinge bracket 15 and the guide hole 59 may be arranged on and the seat cushion 7.

Figure 8:
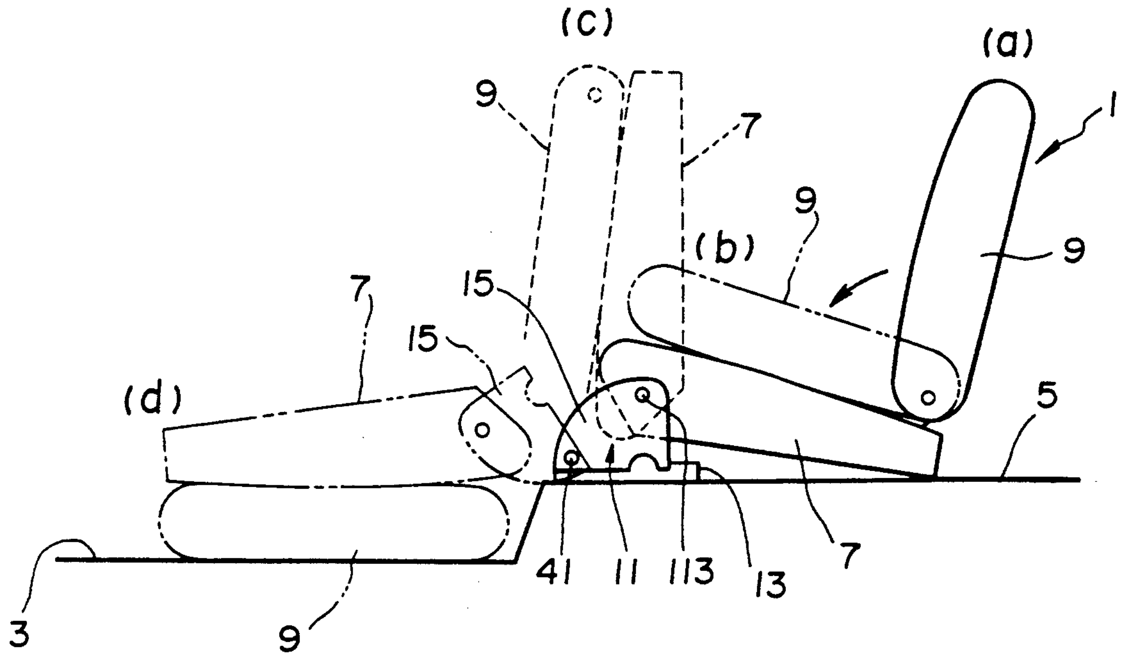
FIG. 8 is an explanatory diagram showing an operational relationship between the rear seat and the seat supporting device.

When the rear seat 1 is in a usual state, the seat cushion 7 is in a first position wherein the seat cushion 7 is occupiable and the seat back 9 is substantially upstanding on the seat cushion 7 as indicated in position (a) of FIG. 8. In this condition, the guide pin 115 secured to the seat cushion 7 is located at an uppermost portion of the arcuate guide hole 59. Since any force is not applied to the lever 17, the lever guide pin 73 secured to the lever 17 is urged by the curved portion 93 of the leaf spring 91 into a lowermost portion in the arcuate lever guide hole 67 of the rotary hinge bracket 15 as viewed in FIG. 2. At this time, the latch 19 is allowed to rotate counterclockwise about the latch support pin 71 due to engagement of the lever guide pin 73 with the notches 79 of the latch 19. The notch 77 of the latch 19 is engaged with the lock pin 43 on the stationary hinge bracket 13. As a result, the rotary hinge bracket 15 is locked to the stationary hinge bracket 13.

When the seat back 9 is folded on the seat cushion 7 as viewed in position (b) of FIG. 8, the seat cushion 7 remains in the first position. The rotary hinge bracket 15 is still locked to the stationary hinge bracket 13.

Figure 6:
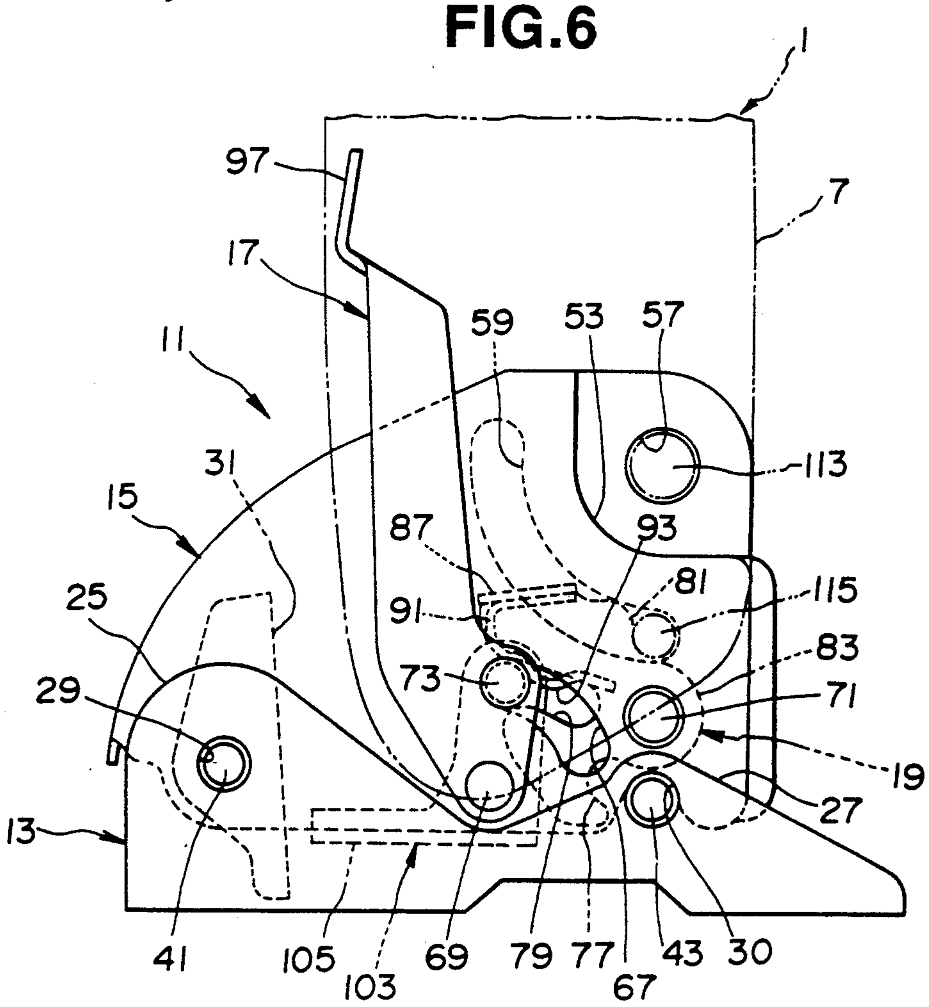
FIG. 6 is a sectional view of the seat supporting device, in which the seat cushion is in a substantially upstanding locked position.

When the seat cushion 7 with the folded seat back 9 is displaced to a second position wherein the seat cushion 7 is substantially upright relative to the vehicle floor as indicated by a dotted line in position (c) of FIG. 8, the guide pin 115 is in the lowermost portion of the arcuate guide hole 59 as seen in FIG. 6. Simultaneously, when the lever 17 is upwardly actuated to rotate about the lever support pin 69, the lever support 103 secured to the lever 17 is counterclockwise or forwardly rotated about the lever support pin 69. In this condition, the lever 17 is substantially upstanding and the end wall 105 of the lever support 103 is substantially parallel to the vehicle floor. The lever guide pin 73 connecting the lever support 103 with the lever 17 upwardly slides along both the notch 79 of the latch 19 and the lever guide pin hole 67 of the rotary hinge bracket 15. During the upward movement of the lever guide pin 73 in the lever guide hole 67, the lever guide pin 73 also slides forward beyond the curved portion 93 of the leaf spring 19. Upon such a movement, the lever guide pin 73 urges the latch 19 such that the latch 19 is rotated clockwise as viewed in FIG. 6 about the latch support pin 71 on the rotary hinge bracket 15. As a result, the latch 19 is disengaged from the lock pin 43 on the stationary hinge bracket 13. Accordingly, the rotary hinge bracket 15 is allowed to be rotatable relative to the stationary hinge bracket 13 about the first axis 41. In this condition, the shoulder 81 of the latch 19 engages the guide pin 115 to urge it against the lowermost portion of the guide hole 59 as indicated in a dotted line in FIG. 6. Thus, the seat cushion in the second position is locked to the rotary hinge bracket 15.

Figure 7:
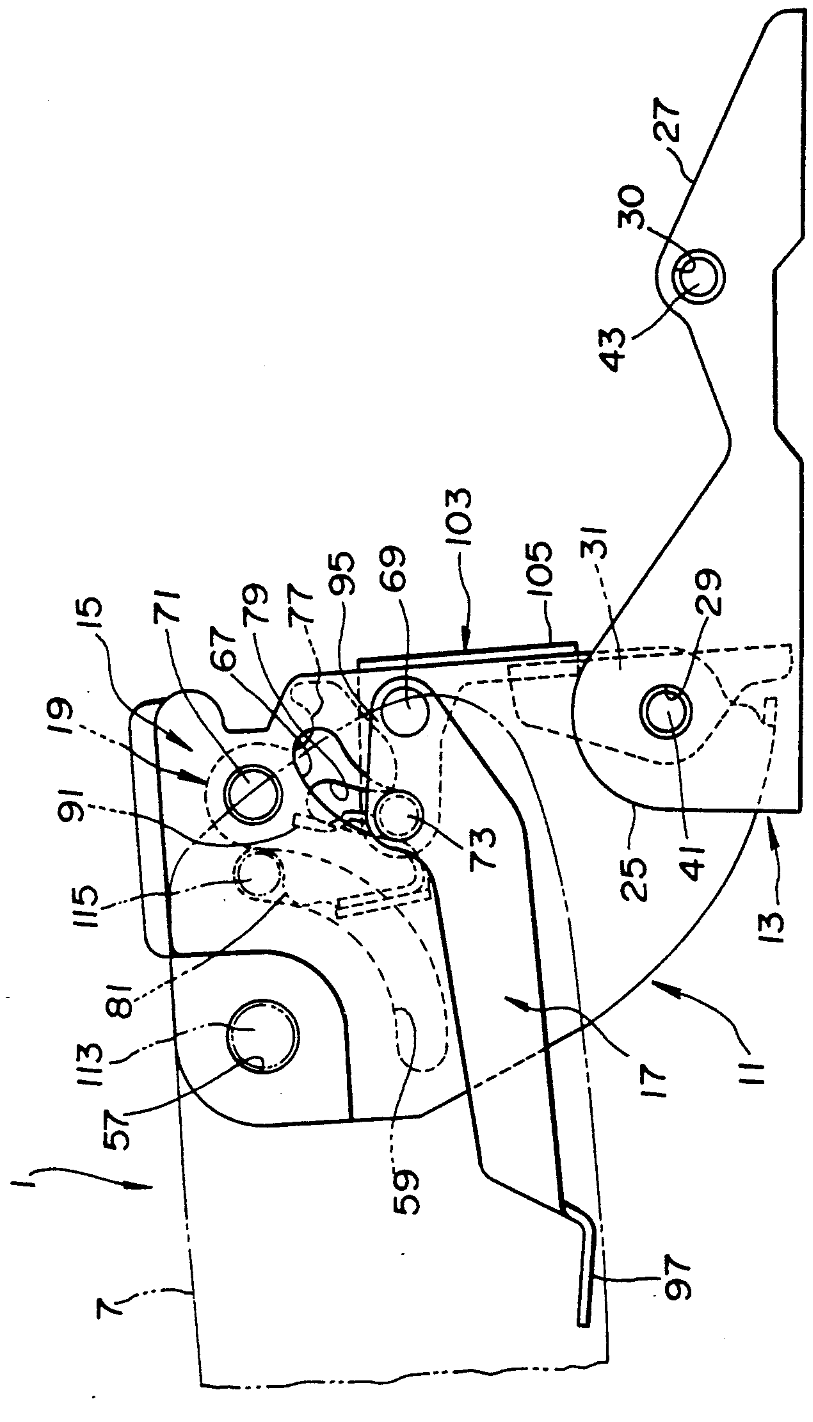
FIG. 7 is a sectional view of the seat supporting device, in which the seat cushion is in a foremost inclined position.

When the rotary hinge bracket 15 and the seat cushion 7 locked thereto are displaced counterclockwise about the first axis 41 to a stored position as indicated in position (d) of FIG. 8, the seat cushion 7 is foremost inclined and substantially parallel to the vehicle floor. Owing to the counterclockwise (forward as viewed in FIG. 7) rotation of the rotary hinge bracket 15, the end wall 105 of the lever support 103 abuts against the stopper 31 secured to the stationary hinge bracket 13. The stopper 31 limits the counterclockwise rotation of the rotary hinge bracket 15.

The seat cushion 7 returns to the original position by performing such an operation in reverse order.

As seen in FIG. 8, the seat supporting device 11 according to the present invention allows the seat cushion 7 to be angularly displaced to two positions. Specifically, as indicated in the position (d) of FIG. 8, the seat cushion 7 with the folded seat back 9 is substantially parallel to the vehicle floor so that the seat cushion 7 in the stored position does not disturb a rearward view of the vehicle driver but increases an available space of the vehicle floor.

What is claimed is:

1. A seat supporting device for a foldable seat, comprising:

a stationary hinge bracket secured to a vehicle floor;

a rotary hinge bracket rotatably mounted on said stationary hinge bracket for rotation about a first axis on said stationary hinge bracket;

a seat cushion rotatably mounted on said rotary hinge bracket for rotation about a second axis on said rotary hinge bracket and having a first position wherein the seat cushion is occupiable, and a second position wherein the seat cushion is angularly displaced about said second axis; and latch means shiftable between a first position wherein said rotary hinge bracket is locked to said stationary hinge bracket and a second position wherein said rotary hinge bracket is rotatable relative to said stationary hinge bracket about said first axis and said seat cushion is locked to said rotary hinge bracket after said seat cushion has been displaced to said second position;

whereby with said latch means in said second position thereof, said seat cushion and said rotary hinge bracket are angularly displaced about said first axis to a stored position.

* * * * *